(12) United States Patent
Dazet

(10) Patent No.: US 6,264,139 B1
(45) Date of Patent: Jul. 24, 2001

(54) AIRCRAFT LANDING GEAR, EQUIPPED WITH A DEVICE FOR PROTECTION OF A NEARBY FUEL TANK, AND AIRCRAFT EQUIPPED WITH THIS LANDING GEAR

(75) Inventor: Francis Dazet, Saint-Alban (FR)

(73) Assignee: Aerospatiale Matra, Paris (FR)

( * ) Notice: Subject to any disclaimer, the term of this patent is extended or adjusted under 35 U.S.C. 154(b) by 0 days.

(21) Appl. No.: 09/473,956

(22) Filed: Dec. 29, 1999

(51) Int. Cl.[7] ............................. B64C 25/00; B64C 25/10
(52) U.S. Cl. ................................ 244/102 R; 244/100 R; 244/121
(58) Field of Search ........................... 244/100 R, 102 R, 244/202, 183, 121

(56) References Cited

U.S. PATENT DOCUMENTS

| | | | | |
|---|---|---|---|---|
| 1,641,700 | * | 9/1927 | Sperry | 244/65 |
| 1,778,477 | * | 10/1930 | Wood | 464/33 |
| 3,185,413 | * | 5/1965 | Walker | 244/63 |
| 3,602,065 | * | 8/1971 | Ratcliff | 274/524 |
| 4,155,522 | | 5/1979 | Sealey | 244/102 R |
| 4,401,285 | * | 8/1983 | Simmonds | 244/100 R |
| 4,408,736 | * | 10/1983 | Kirschbaum et al. | 244/100 R |
| 5,058,827 | * | 10/1991 | Dansereau et al. | 244/103 R |
| 5,333,816 | * | 8/1994 | Del Monte | 244/50 |

FOREIGN PATENT DOCUMENTS 2 320 002   6/1998   (GB) ............................. B64C 25/00

* cited by examiner

Primary Examiner—Charles T. Jordan
Assistant Examiner—Christian M. Best
(74) Attorney, Agent, or Firm—Burns Doane Swecker & Mathis

(57) ABSTRACT

An aircraft landing gear (16) located in front of a fuel tank is equipped with a protection device (22) designed to at least partially automatically disconnect the landing gear (16) from the structure that supports it. For example, the protection device (22) comprises a part (40) hinged on the landing gear, and mechanisms (42) connecting this part to pins (38) through which the landing gear (16) is installed on the aircraft. In the case of a bad landing, the landing gear pivots backwards and the part (40) collides with a reinforcement wall placed on the tank. The part (40) then pivots about its axis and releases the pins (38) from their housing. Perforation of the tank is thus prevented.

19 Claims, 5 Drawing Sheets

AIRCRAFT LANDING GEAR, EQUIPPED WITH A DEVICE FOR PROTECTION OF A NEARBY FUEL TANK, AND AIRCRAFT EQUIPPED WITH THIS LANDING GEAR

DESCRIPTION

1. Technical Field

This invention relates to an aircraft landing gear equipped with a device for the protection of a fuel tank located behind the landing gear.

The invention also relates to an aircraft, particularly a commercial aircraft, such as an aircraft designed for passenger and/or freight transport, comprising a landing gear of this type.

2. State of the Art

In commercial aircraft, the fuel tanks are normally located in the wing and in the lower part of the fuselage segment supporting the wing, in front of the main landing gear. This central position of the tanks symmetric to the longitudinal plane through the center line of the aircraft facilitates management of the aircraft center of gravity. In other words, the position of the center of gravity of the aircraft changes very little as the mass of fuel reduces as it is burned in the engines.

When it is required to increase the capacity and range of an aircraft, it may be necessary to modify the aircraft and design a new version, but without modifying its essential characteristics. This makes it possible to use the maximum number of parts in common on different versions of the same aircraft.

Consequently, a new version of an existing aircraft characterized by a higher capacity and range than in the basic version, may be defined without modifying the wing or the segment that supports the wing. Under these conditions, fuel tanks contained in the wing and in this segment are not modified either, such that their capacity remains unchanged. An additional fuel tank then has to be added to enable the aircraft to fulfill its new mission, which requires that an additional quantity of fuel is available in order to increase its range. A preferred position for this additional tank is in the lower part of the fuselage behind the main landing gear. This position located on the center line of the aircraft automatically enables good fuel management without changing the center of gravity of the aircraft, in other words without any mechanical, hydraulic or other action.

However, this position of the additional fuel tank can be critical under particular landing conditions. When the aircraft is landing, friction induced by the action of brakes on the wheels can increase the temperature of the braking device to very high values (up to 1200° C.). In the case of a bad landing, the main landing gear can fold backwards, for example due to the presence of an obstacle on the track or due to breakage of some structural parts. In this case there is a severe risk that the landing gear, and particularly the braking system located on the wheels, can strike and penetrate the partition that separates the landing gear from the additional fuel tank. Under these circumstances, contact between braking elements at a very high temperature and the fuel could cause explosion of the fuel and consequently fast and complete destruction of the aircraft.

In practice, it is impossible to completely eliminate the risk of a bad landing. Consequently, explosion of the aircraft following a bad landing would be unacceptable.

A comparable risk exists close to the jet engines on aircraft. There is a turbine behind the combustion chamber for each jet, in which the blades are at a very high temperature. Therefore, in the case of a blade breakage, it is essential that the blade could never come into contact with elements vital to control of the aircraft, such as flight controls, hydraulic circuits, etc., or fuel, during its trajectory. The current solution used for fuel consists of eliminating the presence of any fuel (circuit, pump, tank, etc.) along the probable ejection cone of a blade.

However, this solution cannot be applied to the case of a fuel tank located behind the main landing gear of the aircraft. Due to the reasons mentioned above, this position has essential advantages that make it unavoidable when an additional tank has to be installed on the aircraft.

DESCRIPTION OF THE INVENTION

The main purpose of the invention is a landing gear designed to be located in front of a fuel tank and in which the landing gear is equipped with protection means for eliminating any risk of collision between elements of the landing gear increased to very high temperature and the fuel under abnormal landing conditions, thus protecting the integrity of the aircraft.

This result is achieved according to the invention by means of an aircraft landing gear that can be connected to part of the aircraft structure by local assembly means, characterized in that the said landing gear is equipped with means of protecting a fuel tank possibly located behind the landing gear, to automatically disconnect at least some of the local assembly means when the landing gear accidentally tilts backwards beyond a predetermined maximum angle.

Thus, if a bad landing causes the landing gear to tilt backwards, the landing gear is automatically partially or completely disconnected from the aircraft structure. Consequently, any risk that hot parts of the landing gear, and particularly the braking device located on the wheels, can come into contact with the fuel, is eliminated. Complete destruction of the aircraft due to fuel explosion caused by the fuel coming into contact with hot parts of the landing gear is thus prevented.

According to one preferred embodiment of the invention, the protection means comprise at least one disconnection control part installed on part of the landing gear structure such that it is free to move and can engage on part of the aircraft structure located between the fuel tank and the landing gear, when the landing gear accidentally tilts backward by a predetermined minimum angle less than the predetermined maximum angle at which the landing gear is automatically disconnected from the aircraft structure.

Part of the aircraft structure on which the disconnection control part is supported is advantageously reinforced in order to protect any perforation in the wall of the fuel tank.

Normally, the localized assembly means by which the landing gear is connected to the aircraft structure include at least one pin connected to the structure of the landing gear, that normally fits into a housing connected to the aircraft structure. In this case, the protection means also comprise at least one mechanism capable of displacing the above mentioned pin parallel to itself to gradually release it from its housing, in response to a displacement of the disconnection control part with respect to the structure of the landing gear, after the landing gear has rotated through an angle between the said predetermined minimum angle and the said predetermined maximum angle.

In order to prevent accidental operation of the protection means and to eliminate parasite movements, for example due to poor condition of the landing runway, the mechanism advantageously includes a frangible device that normally fixes the pin with respect to the structure of the landing gear when the force exerted on this frangible device remains below a predetermined threshold.

Normally, the localized assembly means comprise two pins in line connected to the landing gear structure that normally fit into two housings in line with each other connected to the aircraft structure. The protection means may then comprise one or two mechanisms capable of moving one or both of the two pins simultaneously, parallel to itself.

Furthermore, in particular the disconnection control part may be installed to pivot on the structure of the landing gear, for example about an axis parallel to the axis of the pin and along a direction transverse to the aircraft.

In this case, the mechanism advantageously comprises a first lever connecting the disconnection control part to a linkage part installed free to pivot on the structure of the landing gear, and a second lever connecting the linkage part to the pin.

The invention also relates to an aircraft comprising at least one landing gear connected to an aircraft structure by localized assembly means, and at least one fuel tank, characterized in that the fuel tank is located behind the landing gear and in that means of protecting the said tank are provided on the landing gear to automatically partially or completely disconnect the localized disassembly means, when the landing gear is accidentally tilted backwards beyond a predetermined maximum angle.

In one preferred embodiment of the invention, the fuel tank is an additional tank located in the lower part of the fuselage and the landing gear forms the main landing gear of the aircraft.

BRIEF DESCRIPTION OF THE DRAWINGS

We will now describe a preferred embodiment of the invention as a non-limitative example, with reference to the attached drawings, in which.

DETAILED DESCRIPTION OF A PREFERRED EMBODIMENT OF THE INVENTION

Figure 1:
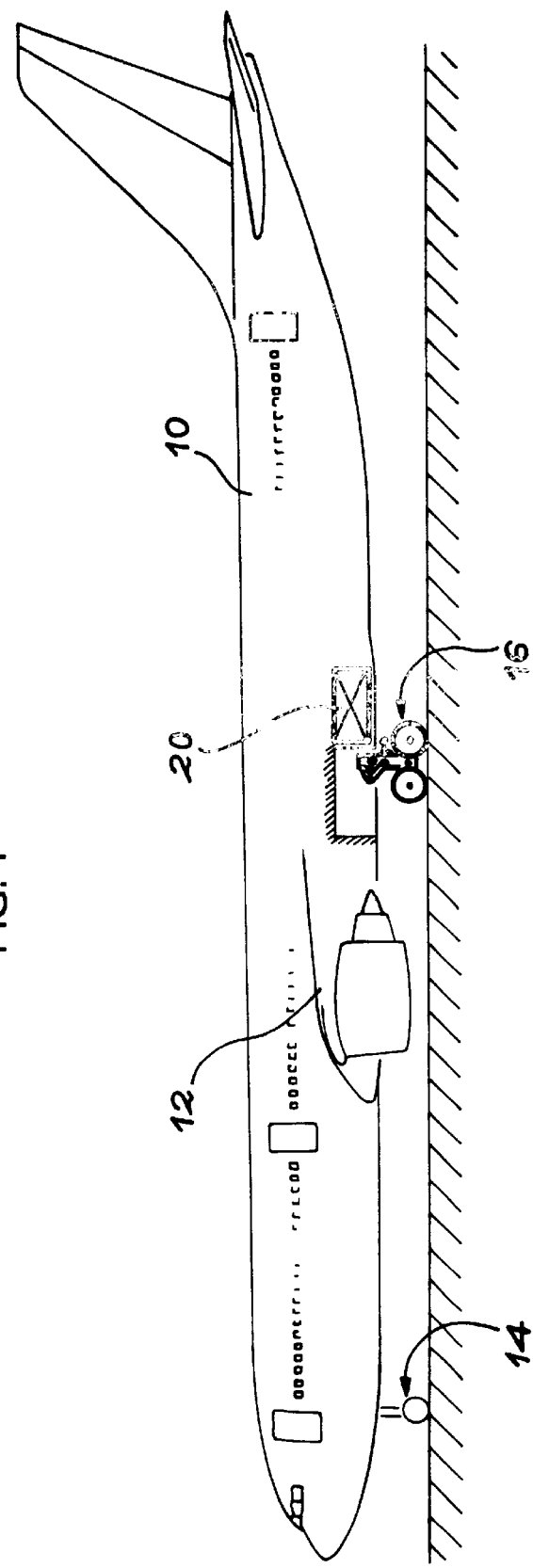
FIG. 1 is a side view diagrammatically showing an aircraft conform with the invention.

FIG. 1 diagrammatically shows an aircraft conform with the invention. This aircraft is a commercial aircraft with a classical general design, intended for the transport of passengers and/or freight. The following description only applies to the characteristics necessary for good understanding of the invention.

In particular, the aircraft structure normally comprises a fuselage 10 and a wing 12. When the aircraft is not in flight, this structure is capable of resting on the ground through an auxiliary front landing gear 14 and a central main landing gear 16. The central main landing gear usually comprises at least two landing gear elements located under the fuselage 10, to which elements of the landing gear may be added under the wing 12. For simplification reasons, the term "landing gear" is used throughout the rest of the text, to denote each element of the landing gear.

Typically, the aircraft is equipped with fuel tanks (not shown) located in the wing 12 and in the lower part of the fuselage segment 10 supporting the wing. This segment is located towards the front of the main landing gear 16 located under the fuselage.

According to the invention, an additional tank 20 is also located on the lower part of the fuselage 10, in a segment of the fuselage located immediately behind the main landing gear 16.

Figure 2:
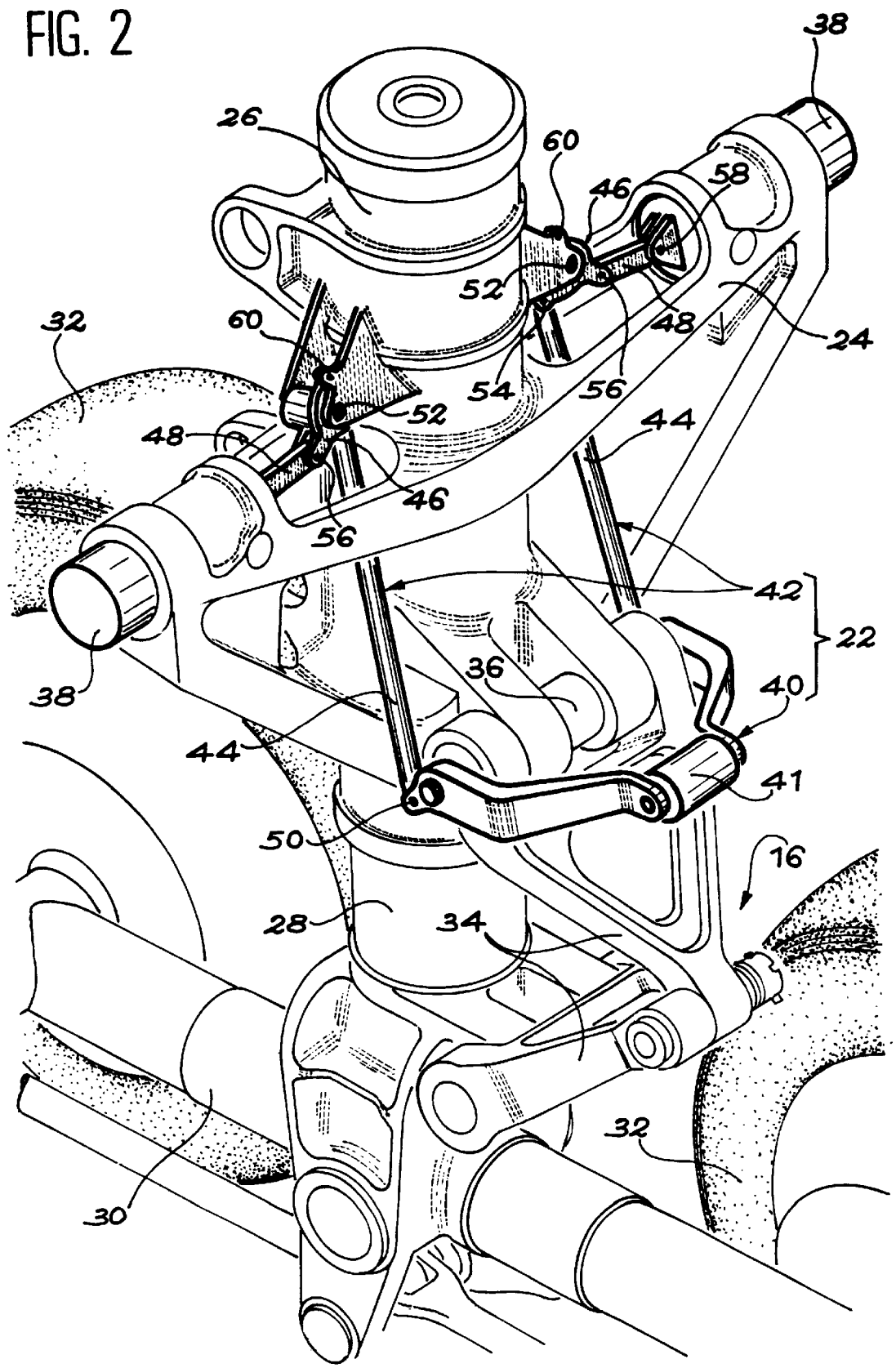
FIG. 2 is a perspective view that shows the main landing gear of the aircraft in FIG. 1, observed from the back, incorporating protection means conform with the invention.

According to the invention, the main landing gear 16 is equipped with protection means 22 shown in bold lines in FIG. 2. The function of these protection means 22 is to automatically, at least partially, disconnect the localized assembly means through which the landing gear 16 is connected to the fuselage 10, when the said landing gear accidentally tilts backwards beyond a predetermined maximum angle.

One preferred embodiment of these protection means 22 and their layout on the landing gear 16 will now be described in detail with reference to FIGS. 2 to 5. The description is made with the landing gear in the extended condition.

As shown particularly in FIG. 2, the structure of the main landing gear 16 comprises a single piece frame 24 with a vertical drum 26 inside which a main shock absorber is housed. The moving lower part 28 of this shock absorber is fitted with a bogie 30 at its lower end, the front and rear ends of which support the bearings for the pair of wheels 32 mounted side by side. A connecting rod system 34 inserted between the drum 26 and the bogie 30 retracts the shock absorber when the landing gear 16 is raised. This connection system 34 is hinged in the lower part of the drum 26 through a hinge pin 36 parallel to the axes of the wheels 32 and orthogonal to the center line of drum 26. The hinge pin 36 is transverse to the aircraft.

The mechanism controlling extension and retraction of the landing gear 16 has deliberately been omitted in FIG. 2 in order to make the figure more easily understandable.

The structure of the landing gear 16 illustrated in FIG. 2 is connected to the aircraft structure, and more precisely in this case to the fuselage 10, through localized assembly means inserted particularly between the frame 24 and the fuselage structure 10. These localized assembly means in this case comprise two cylindrical pins 38 in line with each other, that normally project on each side of the frame 24 parallel to the center line 36 and to the center line of wheels 32 and orthogonal to the center line of drum 26. These pins 38 normally fit into the complementary cylindrical housings (not shown) provided for this purpose in the structure of the fuselage 10.

The localized assembly means including the two pins 38 and their complementary housings enable the landing gear 16 to pivot between its extended state illustrated in FIG. 2, and its retracted state in which the gear is retracted into a landing gear compartment provided for this purpose under the fuselage 10 of the aircraft.

In the preferred embodiment of the invention illustrated on FIGS. 2 to 5, the protection means 22 comprise a disconnection control part 40, supported by drum 26 and free to move, and a pair of mechanisms 42 connecting this part 40 to each of the pins 38. These parts are laid out so that the pins 38 are moved parallel to their common center line, to gradually and at least partially disconnect the landing gear 16 from the fuselage structure 10, when a landing creates a risk that hot parts of the landing gear could come into contact with the fuel contained in the tank 20.

In the embodiment illustrated in the figures, the disconnection control part 40 is approximately U-shaped. This part 40 is installed so that it can pivot about its ends on drum 26 about hinge pin 36 through which the linkage system 34 is itself hinged onto the drum. The part 40 is fitted with a roller 41 near its middle.

Figure 3:
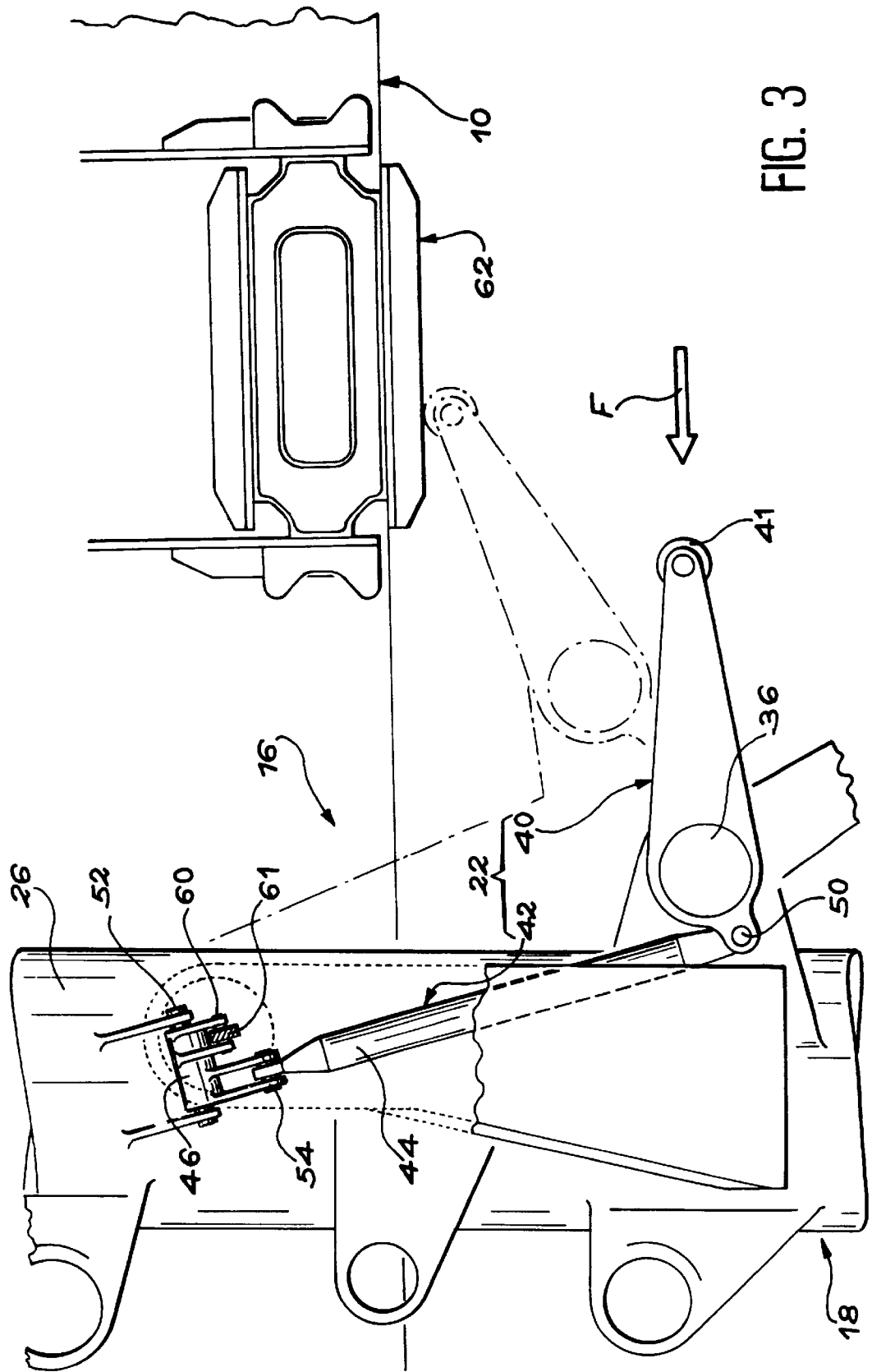
FIG. 3 is a side view diagrammatically showing the layout of protection means in the top part of the landing gear in FIG. 2, and the adjacent part of the aircraft structure located immediately behind the landing gear.
Figure 4:
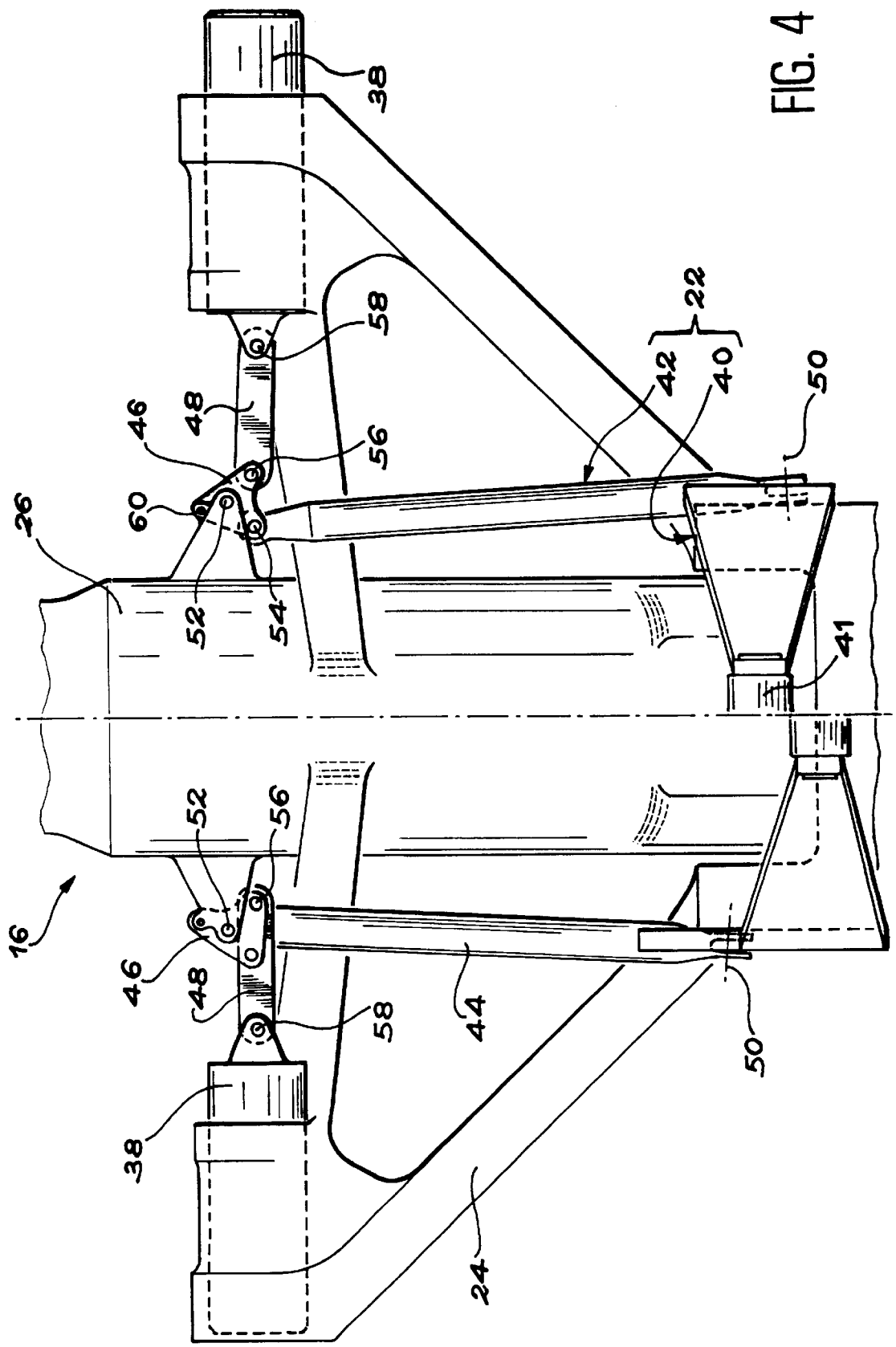
FIG. 4 shows the top part of the landing gear in FIGS. 2 and 3, observed along arrow F in FIG. 3, the protection means being shown in the normal inactive position on the right half, and in the active accidental landing position on the left half, respectively.

As shown particularly in FIGS. 2 and 3, when the landing gear 16 is extended and when the drum 26 is approximately in the vertical position, the disconnection control part 40 projects backwards along an approximately horizontal direction starting from hinge pin 36. It is then located above the connecting rod system 34 and it can move downwards through a sufficiently large angle to completely retract the pins 38 inside the frame 24, through mechanisms 42. This layout means that the landing gear 16 can be disconnected under accidental landing conditions that introduce a risk that the wall of tank 20 could be perforated by the landing gear.

The disconnection control part 40 acts on each pin 38 through an identical mechanism 42 laid out symmetrically with respect to a median vertical plane of landing gear 16. The following description is therefore applicable to each of these mechanisms 42.

Each mechanism 42 comprises a first lever or connecting rod 44 that connects the disconnection control part 40 to a linkage part 46 mounted free to pivot on drum 26. The mechanism 42 also comprises a second lever or connecting rod 48 that connects the linkage part 46 to the pin 38 located on the side of this mechanism.

More precisely, the first lever 44 is laid out to be approximately vertical and its lower end is connected to an adjacent end of part 40 through a hinge pin 50 located slightly forwards from the hinge pin 36 about which part 40 is hinged on drum 26, and is approximately parallel to this hinge pin.

Furthermore, the linkage part 46 is supported free to rotate in the top of drum 26 about a hinge pin 52 orthogonal to the axes of the drum 26 and pins 38, and is located at a slightly higher level than the level of the center line of the pins. The top end of the first lever 44 is hinged on the linkage part 46 about a hinge pin 54, initially offset towards drum 26 with respect to hinge pin 52 (see the right part of FIG. 4).

The second lever 48 is located approximately along the center line of the pin 38. One of its ends is hinged on the linkage part 46 about a hinge pin 56, initially located on the same side of the hinge pin 52 as the pin 38. The other end of the second lever 48 is hinged to the end of the pin 38 rotated towards drum 26 by a hinge pin 58. Hinge pins 54, 56 and 58 are parallel to hinge pins 52 on which the linkage parts 46 are mounted free to rotate on the drum 26.

In order to prevent accidental operation of the protection means 22, for example caused by poor condition of the landing runway, a frangible device is inserted between each of the mechanisms 42 and the structure of the landing gear 16. In the embodiment shown, this frangible device is composed of a safety pin 60 that passes through the linkage part 46 and through a lug 61 (FIG. 3) fixed to the drum 26.

As shown particularly in FIG. 3, the fuselage structure 10 located between the landing gear 16 and the tank 20 (FIG. 1) comprises a reinforced part 62 on which the disconnection control part 40 bears, as shown in discontinuous lines, in the case of a normal landing of the aircraft. This reinforced part 62 prevents any risk of perforation of the fuel tank 20, before the landing gear 16 is disconnected from the fuselage structure 10.

Figure 5:
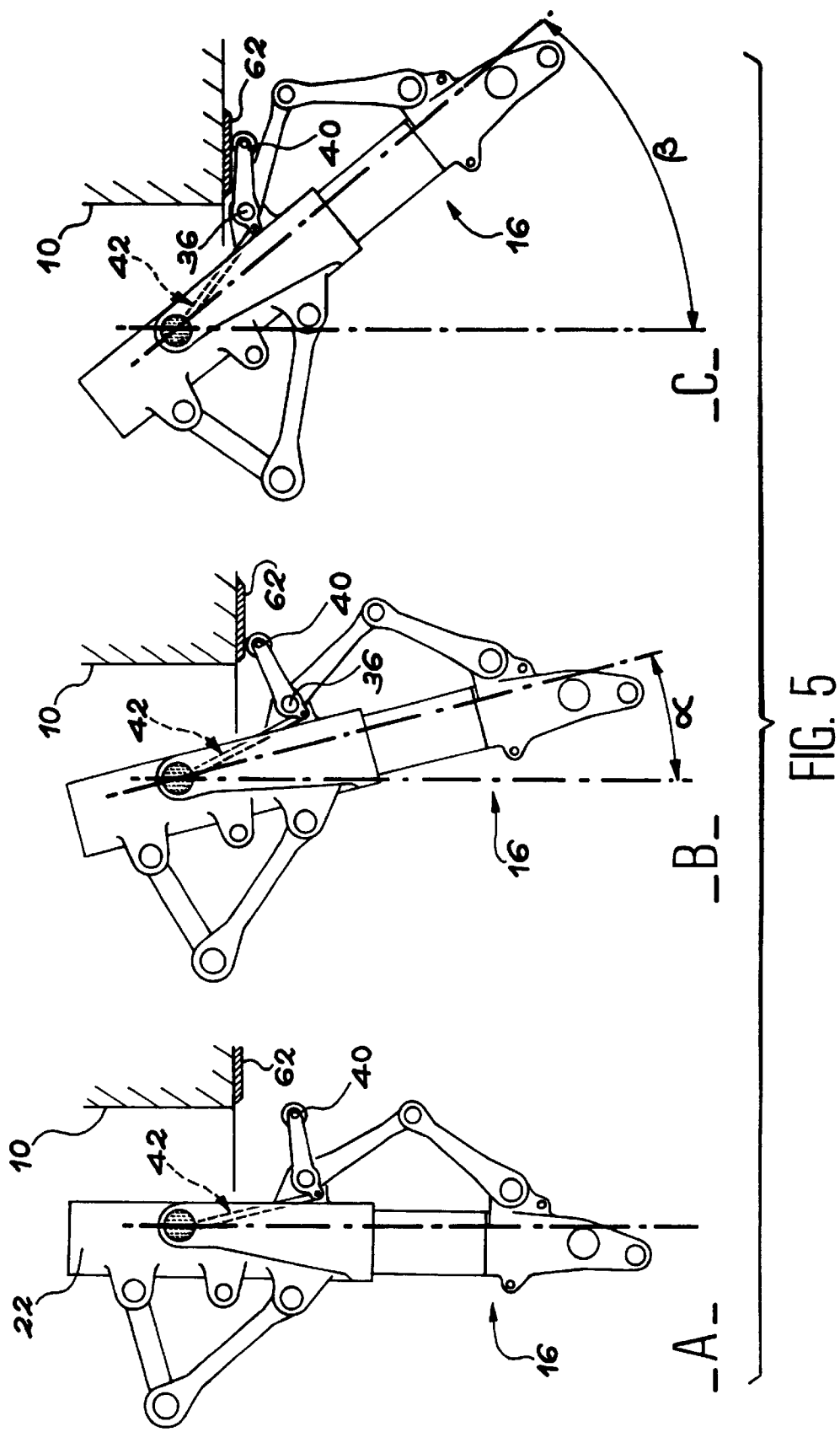
FIG. 5 diagrammatically shows the landing gear at A, B and C supporting protection means, in its normal inactive state after an initial pivoting backwards to control initial actuation of the protection means, and after pivoting further backwards sufficiently to disconnect the landing gear, respectively.

We will now describe an example embodiment of the protection means 22 described above, particularly with reference to parts A, B and C in FIG. 5.

When the aircraft performs a normal landing, the landing gear 16 is in the condition shown in A. Under these conditions, the drum 26 remains approximately vertical and the part 40 does not approach the reinforced part 62 of the fuselage structure 10. Therefore, there is no displacement of part 40, such that mechanisms 42 that connect this part to each of the pins 38 are not actuated. Therefore, the pins remain in contact in their housing and transmit the forces exerted by the landing gear to the fuselage structure in the conventional manner.

In the case of an abnormal landing, the landing gear 16 can pivot backwards about the axis of pins 38, for example due to the presence of an obstacle on the runway or following the breakage of some structural parts. The roller 41 installed at the back of the part 40 then bears on the reinforced part 62 of the fuselage structure 10, after the landing gear 16 has pivoted through an angle α as shown at B in FIG. 5.

If the landing gear 16 continues to pivot backwards about the axis of pins 38 beyond this angle α, the part 40 pivots about axis 36, in the clockwise direction as shown on FIG. 5. Under the effect of this pivoting, each of the pins 38 moves along its axis towards drum 26, so that it is gradually extracted from the housing in which it normally fits inside the fuselage structure. Thus, when the landing gear 16 has pivoted backwards through an angle β, as shown at C in FIG. 5, the pins 38 are fully released from their housings and the gear 16 is then at least partially disconnected from the fuselage structure. The angle β is significantly greater than the angle α as shown in FIG. 5.

This makes it impossible for a force to be applied on the fuselage structure 10 adjacent to the fuel tank 20 possibly causing perforation of the lower wall of this tank, and prevents hot parts of the landing gear from coming into contact with the fuel. This prevents any risk of complete destruction of the aircraft due to an explosion of fuel caused by the fuel coming into contact with the landing gear.

The presence of the safety pin 60 prevents excessively fast disconnection when the landing gear pivots backwards when landing on a runway in poor condition, when there is no risk of perforation of the fuel tank 20.

The embodiment that has just been described as an example may be modified in a number of ways without going outside the framework of the invention. Thus for example, instead of acting simultaneously on the two pins 38, the protection means 22 may be designed so that it only retracts one of the pins under accidental landing conditions. When the protection means come into action, the bottom of the landing gear is severely unbalanced on one side, such that it moves away from the aircraft trajectory more quickly.

Furthermore, the protection means themselves may be made differently. In particular, the pivoting part 40 may be replaced by a sliding part. The mechanism(s) connecting this part to the pins(s) 38 may then be of any appropriate shape. More generally, the mechanical disconnection control may be replaced by another type of control, for example hydraulic or electric, triggered by activation of a contact when it bears on the surface of the reinforced part of the fuselage structure.

Furthermore, the protected layout may also be used in the case of landing gear located in front of a fuel tank in any other location of an aircraft, and particularly under the wing.

What is claimed is:

1. An aircraft landing gear adapted to be connected to part of an aircraft structure by a local assembly means, in which said landing gear is equipped with a control part adapted to engage a reinforced part of said aircraft structure when said landing gear tilts backwards beyond a predetermined angle, and to automatically disconnect, at least some of said local assembly means when said landing gear tilts backwards beyond a predetermined maximum angle.

2. The landing gear according to claim 1, wherein said disconnection control part includes a roller that is free to move and can engage on part of said aircraft structure located between a fuel tank and said landing gear.

3. The landing gear according to claim 2, wherein said localized assembly means further includes at least one pin connected to the structure of said landing gear, said pin normally fits into a housing connected to said aircraft structure, said protection means further comprising at least one mechanism capable of displacing said pin parallel to itself to gradually release said pin from said housing, in response to a displacement of said disconnection control part with respect to the structure of said landing gear, after said landing gear has rotated through an angle between said predetermined minimum angle and said predetermined maximum angle.

4. The landing gear according to claim 3, wherein said mechanism includes a frangible device fixedly attaching said pin with respect to said structure of said landing gear wherein forces exerted on said frangible device remains below a predetermined threshold.

5. The landing gear according to claim 4, wherein said localized assembly means comprises two pins in line connected to said landing gear structure wherein said pins fit into two housings in line with each other; and connected to said aircraft structure, said protection means comprising one or two mechanisms capable of moving one or both of said pins simultaneously, parallel to said protection means.

6. The landing gear according to claim 3, wherein said disconnection control part is free to pivot on said structure of said landing gear.

7. The landing gear according to claim 6, wherein said disconnection control part is free to pivot about an axis parallel to an axis of said pin.

8. The landing gear according to claim 7, wherein said mechanism comprises a first lever connecting said disconnection control part to a linkage part installed free to pivot on said structure of said landing gear, and a second lever connecting said linkage part to said pin.

9. Aircraft comprising at least one landing gear connected to an aircraft structure by localized assembly means, and at least one fuel tank, in which the fuel tank is located behind the landing gear and means of protecting the said tank are provided on the landing gear to automatically partially or completely disconnect the localized disassembly means, when the landing gear is accidentally tilted backwards beyond a predetermined maximum angle.

10. Aircraft according to claim 9, in which the protection means comprise at least one disconnection control part installed on part of the landing gear structure such that it is free to move and can engage on part of the aircraft structure located between the fuel tank and the landing gear, when the landing gear accidentally tilts backward by a predetermined minimum angle less than the predetermined maximum angle.

11. Aircraft according to claim 10, in which the said part of the aircraft structure is reinforced.

12. Aircraft according to claim 10, in which the localized assembly means include at least one pin connected to the structure of landing gear, that normally fits into a housing connected to the aircraft structure, the protection means also comprising at least one mechanism capable of displacing the above mentioned pin parallel to itself to gradually release it from its housing, in response to a displacement of the disconnection control part with respect to the structure of the landing gear, after the landing gear has rotated through an angle between the said predetermined minimum angle and the said predetermined maximum angle.

13. The aircraft according to claim 9, in which said fuel tank is located in the lower part of a fuselage and said landing gear forms a main landing gear of said aircraft.

14. An aircraft landing gear adapted to be connected to an aircraft structure by localized assembly means, wherein said landing gear comprises protection means, the protection means including a control part having a roller disposed thereon, for avoiding collision between hot parts of the landing gear and a fuel tank located behind said landing gear, said protection means being adapted to automatically disconnect at least partially said localized assembly means when said landing gear accidentally tilts backwards beyond a predetermined maximum angle.

15. An aircraft landing gear adapted to be pivotally connected to an aircraft structure via localized assembly means allowing the landing gear to pivot between an extended state and a retracted state, wherein said landing gear comprises protection means adapted to automatically bring said localized assembly means in a disconnected state, in which the landing gear is at least partially disconnected from the aircraft structure, and said protection means including a control part engages a reinforced part of said aircraft structure when said landing gear accidentally tilts backwards beyond a predetermined angle about said localized assembly means.

16. An aircraft landing gear adapted to be connected to an aircraft structure via localized assembly means allowing said landing gear to pivot between an extended state and a retracted state, said localized assembly means including two coaxial housings carried by the aircraft structure and two coaxial pins carried by the landing gear and that normally fit in to said housings, wherein said landing gear comprises protection means adapted to automatically move at least one of said pins out of said housings when the landing gear accidentally tilts backwards beyond a predetermined maximum angle.

17. An aircraft landing gear unit comprising:
a landing gear and localized assembly means connecting said landing gear to an aircraft structure, said localized assembly means including at least one housing adapted to be connected to said aircraft structure and at least one pin carried by said landing gear and that normally fit into said housing, wherein said landing gear comprises protection means, said protection means including a control part having a roller rotatably mounted thereto and adapted to engage part of said aircraft structure, and adapted to automatically move said pin out of said housing when the landing gear tilts backwards beyond a predetermined maximum angle.

18. An aircraft landing gear unit comprising a landing gear and localized assembly means normally connecting said landing gear to an aircraft structure, said localized assembly means including at least one housing adapted to be secured to said aircraft structure and at least one pin carried by the landing gear and that normally fits into said housing, wherein said landing gear comprises protection means including a control part adapted to engage a reinforced part of said aircraft structure when said landing gear tilts backwards beyond a predetermined angle, and linkage means connecting said control part to said pin, in order to automatically move the latter out of said housing when said control part engages said reinforced part.

19. An aircraft landing gear unit comprising a landing gear and localized assembly means normally connecting said landing gear to an aircraft structure, where said landing gear comprises protection means including a control part adapted to engage a reinforced part of the aircraft structure when the landing gear tilts backwards beyond a predetermined angle, and linkage means connecting said control part to said localized assembly means, in order to automatically switch the latter to a disconnected state, in which the landing gear is at least partially disconnected from the aircraft structure when said control part engages said reinforced part.

\* \* \* \* \*